(12) United States Patent
Iijima et al.

(10) Patent No.: US 8,815,142 B2
(45) Date of Patent: Aug. 26, 2014

(54) METHOD OF MANUFACTURING A RESIN MOLDED GEAR BY INJECTION MOLDING

(75) Inventors: Gaku Iijima, Yokohama (JP); Osamu Suzuki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 255 days.

(21) Appl. No.: 13/493,154

(22) Filed: Jun. 11, 2012

(65) Prior Publication Data
US 2013/0009345 A1 Jan. 10, 2013

(30) Foreign Application Priority Data
Jul. 4, 2011 (JP) ................................. 2011-148459

(51) Int. Cl.
*B29C 45/73* (2006.01)
*B29C 45/72* (2006.01)
*B29L 15/00* (2006.01)

(52) U.S. Cl.
CPC ....... *B29C 45/7207* (2013.01); *B29L 2015/003* (2013.01)
USPC ..................... 264/327; 264/328.16

(58) Field of Classification Search
CPC ....... B29C 45/7207; B29L 2015/003
USPC ............................ 264/327, 328.16
See application file for complete search history.

(56) References Cited

U.S. PATENT DOCUMENTS

| 4,548,773 A | * | 10/1985 | Suh et al. ............... 264/40.6 |
| 5,320,795 A | * | 6/1994 | Mitchell et al. ............ 264/318 |
| 7,261,536 B2 | * | 8/2007 | Seno et al. ................ 425/130 |
| 2002/0014722 A1 | * | 2/2002 | Baresich ................... 264/327 |

FOREIGN PATENT DOCUMENTS

| JP | 11-13861 A | 1/1999 |
| JP | 2002-235835 A | 8/2002 |
| JP | 2003-326578 | * 11/2003 |
| JP | 2007-130902 A | 5/2007 |

* cited by examiner

*Primary Examiner* — Jill Heitbrink
(74) *Attorney, Agent, or Firm* — Fitzpatrick, Cella, Harper & Scinto

(57) ABSTRACT

Provided is a method of manufacturing a resin molded gear, which is to be integrally formed by injection molding, and includes: a tooth portion formed along an outer peripheral surface of a rim; a web extending along an inner peripheral surface of the rim; and a gate portion arranged at a boss, which joins to at least part of the web and is formed on a core portion located at a center axis, the method using a synthetic resin having a melting temperature of Tm° C., the method including: injecting and loading the synthetic resin molten at the melting temperature of Tm° C. into a cavity of a mold for forming the resin molded gear; and setting, when the gate portion is solidified, a thickness center temperature T1 of the web to (Tm−20)° C. or more to (Tm+20)° C. or less and a surface temperature T2 of the tooth portion to (T1−50)° C. or less.

5 Claims, 4 Drawing Sheets

METHOD OF MANUFACTURING A RESIN MOLDED GEAR BY INJECTION MOLDING

BACKGROUND OF THE INVENTION

1. Field of the Invention

The present invention relates to a method of manufacturing a resin molded gear by injection molding. In particular, the present invention relates to a technology in which a high-precision resin molded gear, which includes a web and a rim and includes a tooth portion arranged at an outer peripheral portion of a molded product, is manufactured by providing, in an injection molding process, temperature ranges for resin temperature of predetermined regions of the gear so as to suppress deformation of the tooth portion, dimensional fluctuation, and increase in shrinkage.

2. Description of the Related Art

Resin molded gears are mounted as power transmission components to a wide variety of mechanical products including office automation (OA) equipment such as a copying machine and a printer, consumable supplies such as an ink cartridge, and small precision equipment such as a digital camera and a video camera.

Conventionally, as the resin molded gear serving as the power transmission component, a spur gear is widely used.

In a case where an improvement in noise reduction performance and contact ratio is highly demanded, a helical gear is used. In recent years, along with an improvement in functionality and quality of mechanical products, there has also been a demand for higher-precision gears, and hence standards for roundness, concentricity, and the like as well as the standards for the helix grading (JIS B 1702) and the contact error (JGMA 116-02) are set to narrower standard ranges in many cases.

As a resin to be used for molding such a gear as described above, polyacetal, polyethylene, nylon, polybutylene terephthalate, polyethylene terephthalate, and polypropylene are taken as examples thereof.

However, any of the resins described above undergoes volumetric shrinkage when the resin changes from a molten state to a solidified state, and further, deformation and sink of a molded product occur depending on conditions such as pressure dwell setting, mold temperature setting, and resin temperature setting, which raises a problem in that gear precision cannot be satisfied.

For example, in a case where polyacetal is used as the resin for molding, a shrinkage percentage thereof is high because the resin is a crystalline resin, and resin temperature is not easily decreased due to latent heat generated at the time of crystallization, which raises a problem in that the molded product is likely to deform. To address this problem, as a conventional technology, there are disclosed a technique of devising a cooling method for a mold to enhance cooling performance, and a technique of pressurizing a surface of the molded product in a cooling process to suppress the deformation and shrinkage thereof.

Further, there is disclosed a technique of setting a partial region of the gear to a predetermined shape or a predetermined thickness so as to suppress the shrinkage.

For example, in Japanese Patent Application Laid-Open No. 2007-130902, a depression concentric with a tooth portion of the gear is provided in a die on a movable mold side, and a projection having a shape conforming to the shape of the depression on the movable side is provided in a die on a stationary mold side so as to be mated with the depression when the mold is closed.

Japanese Patent Application Laid-Open No. 2007-130902 discloses a technology in which a cooling medium channel concentric with the tooth portion is arranged inside the projection, to thereby enhance the cooling performance for the tooth portion of the gear.

Further, Japanese Patent Application Laid-Open No. 2002-235835 discloses a technology in which a step of pressurizing part of a gear-shaped portion with use of a pressurization mechanism mounted to the mold is provided in an injection molding process in addition to a pressure dwelling step, to thereby provide a high-precision resin molded gear having an improved shape and dimensional accuracy.

Further, Japanese Patent Application Laid-Open No. H11-13861 discloses a technology in which, in a resin molded gear including a web and a rim and including a tooth portion arranged at an outer peripheral portion of a molded product, thicknesses of the rim and the web are each set at a ratio in a given range relative to a pitch circular thickness of the tooth, to thereby obtain a high-precision gear.

When the gear is molded, shrinkage inevitably occurs, and it has been known that the shrinkage affects the gear precision depending on a shrinkage amount and a shrinkage tendency.

Further, it has also been known that deformation and dimensional fluctuation as well as the shrinkage affect the gear precision. There are provided several measures for suppressing the shrinkage in the injection molding. Among others, the following five factors are most effective to be changed: (1) thickness of the molded product, (2) gate dimension, (3) injection pressure, (4) screw advancing time period, and (5) mold temperature.

However, the contents of the items (1) and (2) may be hard to change depending on intended use of the molded product.

Therefore, the measures to be generally taken for reducing the shrinkage mainly include changing of the molding conditions of the items (3) to (5).

Hereinafter, a relationship between the shrinkage percentage and the injection pressure, the screw advancing time period, and the mold temperature is specifically described.

Injection pressure: As the injection pressure becomes higher, the shrinkage percentage becomes lower.

However, even when a high injection pressure is applied, the pressure to be transmitted into a cavity varies depending on the degree of a local pressure loss. Therefore, the pressure loss becomes most significant in the vicinity of a final loading section located at the largest resin flowing distance. Accordingly, in this region, the shrinkage amount increases and also the dimensional fluctuation or the like is likely to occur.

Screw advancing time period: The screw advancing time period refers to a time period in which the resin inside the cavity is continuously compressed by the injection pressure, that is, a time period from the start of advancing the screw or the plunger to the start of retreating the screw or the plunger.

When the screw advancing time period reaches to a gate solidification time point, the shrinkage percentage becomes lowest, but when the screw advancing time period falls short of the gate solidification time point, the shrinkage percentage increases.

Mold temperature: As the mold temperature becomes lower, the shrinkage percentage becomes lower.

However, as the mold temperature becomes lower, the pressure loss becomes more significant in the process in which the resin flows, with the result that the fluctuation occurs in the pressure to be transmitted into the cavity.

Further, along with deterioration of flowability, the surface property may deteriorate.

That is, it is found that the shrinkage phenomenon depends significantly on the pressure state and the mold temperature state inside the cavity. Further, those two states significantly affect the deformation and the dimensional fluctuation as well as the shrinkage.

Next, the effects of the pressure state and the mold temperature state inside the cavity are described in detail by taking a gear of FIG. 2 as an example.

The gear includes a rim 11 formed into a cylindrical shape, teeth 12 formed along an outer peripheral surface of the rim in an outward direction from a center axis 15 of the cylindrical rim, a web 13, which joins to an inner peripheral surface of the rim and extends in a direction toward the center axis to have a flat disc shape, a boss 14, which joins to the web and is formed on a core portion located at the center axis, and a gate 16.

As the pressure to be applied inside the cavity becomes higher, the shrinkage percentage becomes lower, and the dimensional fluctuation also becomes smaller. Thus, the higher injection pressure is more effective.

However, after the resin is loaded into the cavity, when a cylinder advances in a pressurization step to progress solidification of the resin at the boss or web portion, the pressurization state attenuates at the rim and the tooth portion, which are located at the largest distance in the pressure transmission path. As a result, sufficient pressurization performance cannot be maintained until the gate is solidified, which raises the problems of dimensional fluctuation and deformation occurring in the rim and the tooth portion.

In order to suppress the attenuation of the pressurization state, the mold temperature is increased as a measure therefor. That is, there is used a method of delaying the transition to the solidified state at the boss and web portion due to a high mold temperature, to thereby maintain the pressurization state until the gate is solidified.

However, as described above, when the mold temperature is high, the shrinkage percentage of the molded product increases, which raises a problem of reduction in gear precision.

Japanese Patent Application Laid-Open No. 2007-130902 discloses the technique of enhancing the cooling performance for the tooth portion by the fittable die having the medium channel, but the pressurization state of the gear is not taken into consideration, and accordingly it is difficult to solve the problems such as the dimensional fluctuation and the deformation. Further, such a configuration potentially raises problems with durability of the mold and manufacture of the mold.

Further, Japanese Patent Application Laid-Open No. 2002-235835 discloses the technique of enhancing the gear precision with use of the pressurization mechanism, but the mold structure becomes complicated so that the manufacture of the mold becomes difficult, and further, there is a problem in that the number of steps in the molding process increases.

Further, Japanese Patent Application Laid-Open No. H11-13861 discloses the technique of suppressing the sink and the deformation by changing the gear shape. However, there is a problem in that the strength and the durability of the gear itself remarkably change due to the changing of the gear shape such as the thickness thereof.

SUMMARY OF THE INVENTION

The present invention has been made in view of the above-mentioned problems, and it is therefore an object thereof to provide a method of manufacturing a resin molded gear by injection molding, which is capable of maintaining a pressurization state of a tooth portion without deterioration of gear precision due to shrinkage.

According to an exemplary embodiment of the present invention, there is provided a method of manufacturing a resin molded gear by injection molding, the resin molded gear being integrally formed of a synthetic resin by injection molding, the resin molded gear including; a rim formed into a cylindrical shape, a tooth portion formed along an outer peripheral surface of the rim in an outward direction from a center axis of the cylindrical shape, a web, which joins to an inner peripheral surface of the rim and extends in a direction toward the center axis to have a flat disc shape; and a gate portion arranged at a boss, which joins to at least part of the web and is formed on a core portion located at the center axis, the synthetic resin including a synthetic resin having a melting temperature of $Tm° C.$, the method including; injecting and loading the synthetic resin molten at the melting temperature of $Tm° C.$ into a cavity of a mold for forming the resin molded gear; and cooling the mold when the gate portion is solidified so that a thickness center temperature $T1$ of the web becomes $(Tm-20)° C.$ or more to $(Tm+20)° C.$ or less and that a surface temperature $T2$ of the tooth portion becomes $(T1-50)° C.$ or less.

According to the present invention, it is possible to attain the method of manufacturing a resin molded gear by injection molding, which is capable of maintaining the pressurization state of the tooth portion without the deterioration of the gear precision due to the shrinkage.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

According to the present invention, there are provided ranges for resin temperature of predetermined regions in a period in a molding process in which pressurization of an interior of a cavity is effective, the period ranging from the start of advancing a cylinder or a plunger of an injection molding machine to a timing at which a gate is solidified.

A thickness center portion of a web portion of a resin molded gear is taken as one example of the predetermined region. A resin temperature T1 at the time of gate solidification is set to (Tm−20)° C. or more relative to a melting temperature Tm° C. of the resin.

Accordingly, the web, which serves as a pressure transmission path to a rim and a tooth portion, is not completely solidified, and hence attenuation of pressurization performance for the rim and the tooth portion is suppressed in the period in which the pressurization is effective, with the result that dimensional fluctuation and deformation can be suppressed in that region.

Further, the resin temperature T1 at the time of gate solidification is set to (Tm+20)° C. or less. Through this setting, it is possible to shorten a time period required for a step of decreasing, by cooling, a surface temperature of a molded product inside the cavity to the melting temperature Tm° C. or less, and thus a molding cycle is shortened so that the resin molded gear can be molded and manufactured at low cost. A range is provided also for a surface temperature of the tooth portion.

A surface temperature T2 of the tooth portion at the time of gate solidification is decreased, by quenching, to (T1−50)° C. Through this setting, shrinkage of the tooth portion can be minimized, and thus a high-precision gear can be formed.

Hereinafter, a method of manufacturing a resin molded gear, which is to be integrally formed of a synthetic resin by injection molding, according to an embodiment of the present invention is described with reference to the attached drawings.

Figure 1:
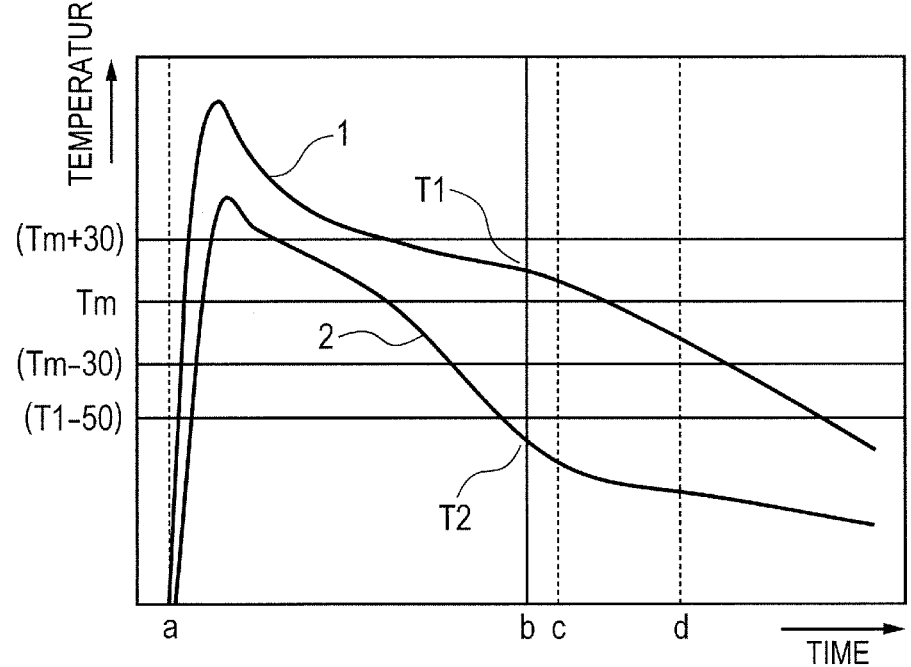
FIG. 1 is a graph showing a temperature history during molding, for describing a method of manufacturing a resin molded gear by injection molding according to an embodiment of the present invention.

FIG. 1 is a graph showing a temperature history during molding, which indicates changes in resin temperature of the predetermined regions of the molded product along with the lapse of time during molding.

Figure 2:
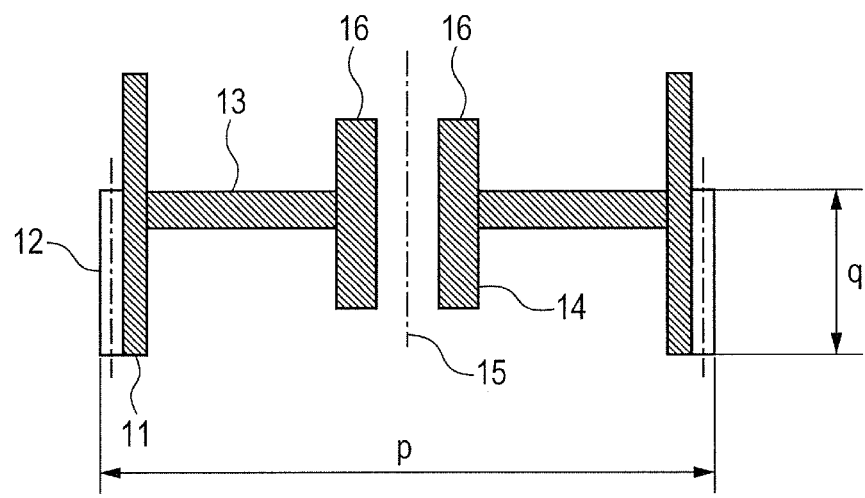
FIG. 2 is a schematic sectional view illustrating an example of a resin molded gear, for describing the method of manufacturing a resin molded gear by injection molding according to the embodiment of the present invention.

The graph shows a resin temperature history 1 at the thickness center of the web portion of the resin molded gear, and a temperature history 2 at the surface of the tooth portion. FIG. 2 is a sectional view illustrating an example of the resin molded gear.

A rim 11 formed into a cylindrical shape is arranged concentrically with a center axis of the gear.

A tooth portion 12 joins onto an outer periphery of the rim as viewed from the center axis. That is, the tooth portion 12 is formed along an outer peripheral surface of the rim in an outward direction from the center axis of the cylindrical shape.

A web 13 extends in a direction from an inner peripheral surface of the rim toward the center axis to have a flat disc shape. A boss 14 formed on a core portion located at the center axis joins to at least part of the web.

A gate portion 16 is arranged at an end portion of the boss. The resin molded gear is mainly manufactured with use of polyacetal, which is a crystalline resin, and is manufactured by injection molding with use of Tenac (trademark) produced by Asahi Kasei Chemicals Corporation or the like.

Figure 3:
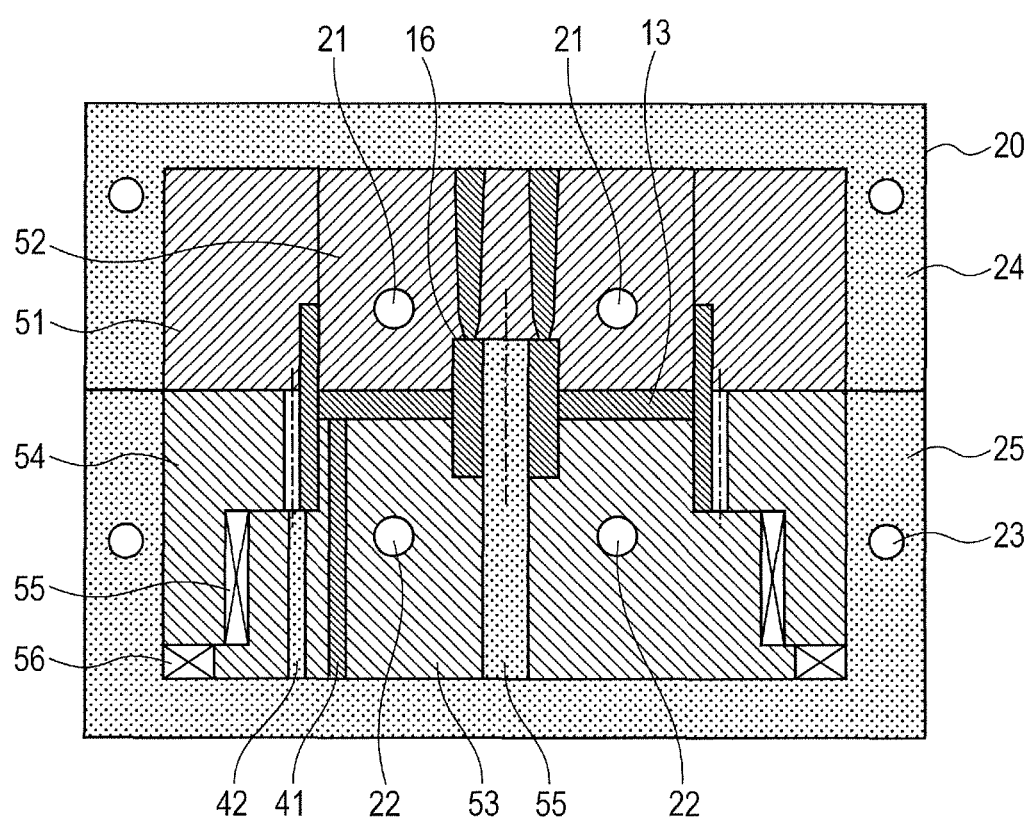
FIG. 3 is a schematic sectional view of an injection mold for molding the resin molded gear according to the embodiment of the present invention.

FIG. 3 is a schematic sectional view of an injection mold 20 for molding the resin molded gear.

The injection mold 20 of FIG. 3 includes gear forming dies 51 and 52 in a stationary mold 24. The gear forming die 51 is configured to form an outer peripheral portion of the gear, and the gear forming die 52 is configured to form the web, an inner peripheral portion of the gear, and the boss.

Further, the gear forming die 52 includes a gate 32, and further includes a medium channel 21 so as to solely change temperature of the die.

A movable mold 25 includes gear forming dies 53, 54, and 55. The gear forming die 53 is configured to form the web, the inner peripheral portion of the gear, and the boss, and includes an internal pressure sensor 42 in a region to be brought into contact with the tooth portion, and a resin temperature sensor 41 in a region to be brought into contact with the web.

Further, the gear forming die 53 includes a medium channel 22 so as to solely change temperature of the die. The gear forming die 54 is configured to form the tooth portion. Further, the gear forming die 55 is configured to form a shaft hole located at the center axis of the gear.

Next, an example of the method of manufacturing a resin molded gear by injection molding according to this embodiment is described with reference to FIG. 1.

In FIG. 1, an injection start time point is represented by "a", a gate solidification time point is represented by "b", a cylinder advance end time point is represented by "c", and a cooling end time point is represented by "d".

The cylinder advance end time point "c" is set so that the gate solidification time point "b" comes before the cylinder advance end time point "c".

At the injection start time point "a", a molten resin is injected and loaded into a mold cavity, and then the cylinder advances so that the resin inside the cavity is pressurized.

After that, along with gate solidification occurring at the gate solidification time point "b", the transmission of the pressurizing force into the cavity is blocked. In this case, the thickness center temperature T1 of the web at this time point is set to (Tm−20)° C. or more to (Tm+20)° C. or less relative to the melting temperature Tm° C. of the resin in use.

For example, in a case where the melting temperature is 150° C., the thickness center temperature T1 is set to 130° C. or more to 170° C. or less.

At this time, the thickness center temperature T1 of the web is measured with the resin temperature sensor 41 of FIG. 3, and is varied by adjusting temperature of the medium flowing through each of the medium channels 21 and 22.

Next, the surface temperature T2 of the tooth portion at the same time point is set to (T1−50)° C. or less. For example, in a case where the preset thickness center temperature T1 of the web is 130° C., the surface temperature of the tooth portion is set to 80° C. or less.

At this time, the surface temperature T2 of the tooth portion is adjusted by extracting the molded product immediately after the gate solidification time point "b", measuring the surface temperature with an infrared camera or the like, and changing temperature of a medium flowing through a mold medium channel 23 of the mold based on the measurement result.

Next, the cooling end time point "d" and the temperature of the medium flowing through the mold medium channel 23 of the mold are adjusted so that the surface temperature of the molded product at the cooling end time point "d" becomes the melting temperature Tm or less.

For example, in a case where a resin having a melting temperature of 150° C. is used, the cooling end time point "d" and the temperature of the medium flowing through the medium channel 23 of the mold are adjusted so that the temperature of the molded product at the cooling end time point "d" becomes 150° C. or less.

The surface temperature of the molded product is measured with an infrared camera or the like, and the temperature of the medium flowing through the medium channel 23 and the cooling end time point "d" are set so as to satisfy the temperature condition for the surface temperature T2 of the tooth portion.

Hereinafter, a difference in gear precision between the molded product manufactured by the manufacturing method of this embodiment and the molded product manufactured by the conventional technology is described with reference to FIGS. 4, 5, 6, and 7.

Figure 4:
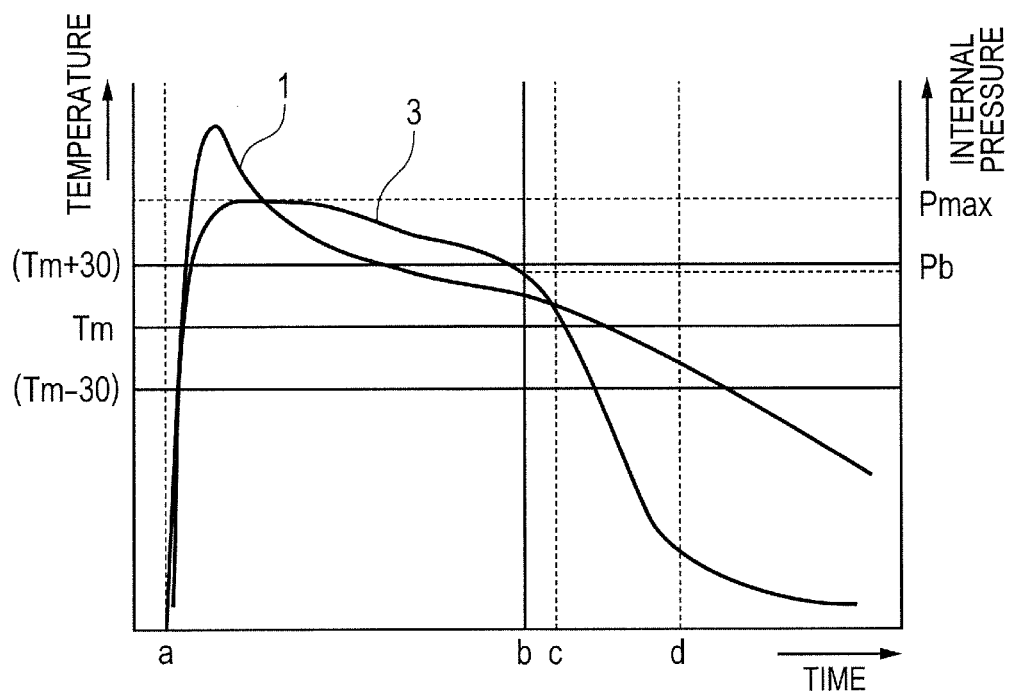
FIG. 4 is a graph showing a temperature history and a pressure history during molding, for describing a difference in gear precision between a molded product manufactured by the method of manufacturing a resin molded gear by injection molding according to the embodiment of the present invention and a molded product manufactured by a conventional technology.

FIG. 4 is a graph showing a history of elapsed time of an internal pressure 3 of the tooth portion measured with the internal pressure sensor 42, and a history of elapsed time of a thickness center temperature 1 of the web portion.

The method of manufacturing a resin molded gear by injection molding according to this embodiment defines temperature states of predetermined regions in a period from the injection start time point "a", at which the cylinder or plunger of the injection molding machine advances so that the resin starts to be loaded into the cavity, to the gate solidification time point "b", at which the gate is solidified.

In accordance with the above-mentioned manufacturing method of this embodiment, the thickness center temperature T1 of the web portion of the resin molded gear is set to (Tm−20)° C. or more, and thus the web, which serves as the pressure transmission path to the rim and the tooth portion, is not completely solidified until the gate solidification time point "b".

Accordingly, the attenuation of the pressurization for the rim and the tooth portion is suppressed in the period in which the pressurization is effective, the period ranging from the injection start time point "a" of the cylinder or plunger to the gate solidification time point "b".

That is, a difference between a peak internal pressure Pmax immediately after the resin is loaded and an internal pressure Pb at the gate solidification time point "b" becomes smaller.

Figure 5:
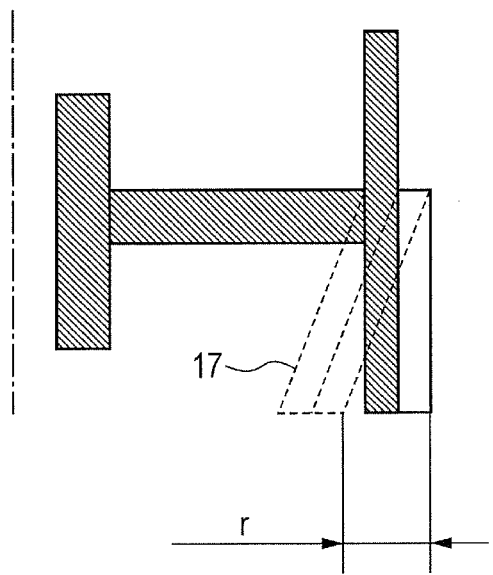
FIG. 5 is a schematic view illustrating deformation of a tooth portion of the resin molded gear, for describing the difference in gear precision between the molded product manufactured by the method of manufacturing a resin molded gear by injection molding according to the embodiment of the present invention and the molded product manufactured by the conventional technology.

FIG. 5 is a view illustrating a final shape 17 obtained when the tooth portion of the gear of FIG. 2 is inclined and deformed in a direction toward the center axis. FIG. 5 also illustrates an inclination amount "r" in this case.

It was found from an experiment that the inclination amount "r" became smaller as the value of the internal pressure Pb at the gate solidification time point "b" became larger, and thus the inclination and deformation of the tooth portion were suppressed.

Figure 6:
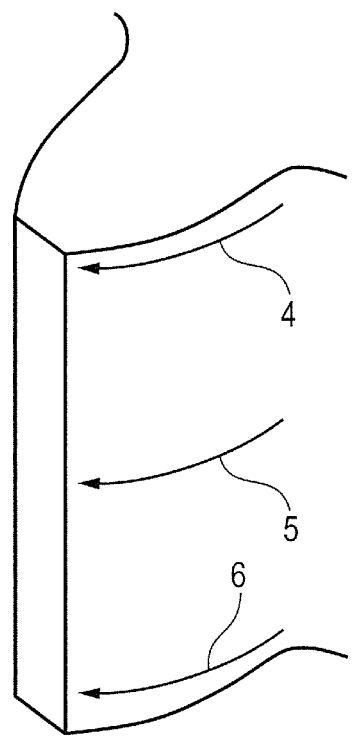
FIG. 6 is a view illustrating tooth shape measurement regions of the resin molded gear, for describing the difference in gear precision between the molded product manufactured by the method of manufacturing a resin molded gear by injection molding according to the embodiment of the present invention and the molded product manufactured by the conventional technology.

FIG. 6 is a view illustrating tooth shape measurement regions of one representative tooth of the gear of FIG. 2.

A tooth shape measurement region 4, a tooth shape measurement region 5, and a tooth shape measurement region are provided in an order from a region close to the surface of the web. The region located at the largest resin flowing distance from the gate is a region in the vicinity of the tooth shape measurement region 6.

It was found from an experiment that the tooth shapes in the tooth shape measurement regions 4, 5, and 6 had smaller fluctuation thereamong as the value of the internal pressure Pb at the gate solidification time point "b" became larger, and thus the dimension of the tooth portion became stable as well.

Further, the thickness center temperature T1 is set to (Tm+20)° C. or less, and hence the resin temperature does not increase more than necessary. Accordingly, the sink can be suppressed in the vicinity of the web portion after the molded product is extracted, with the result that the gear precision is enhanced.

Further, the cooling end time point "d" can be set as early as possible, and hence the molding cycle is not extended, with the result that the resin molded gear can be molded at low cost.

Further, the molding method of this embodiment has such a feature that shrinkage behavior of the tooth portion is suppressed by decreasing, by cooling, the surface temperature T2 of the tooth portion so that the temperature difference of 50° C. or more is obtained relative to the resin temperature T1 at the thickness center of the web in the period in which the pressurization is effective.

Figure 7:
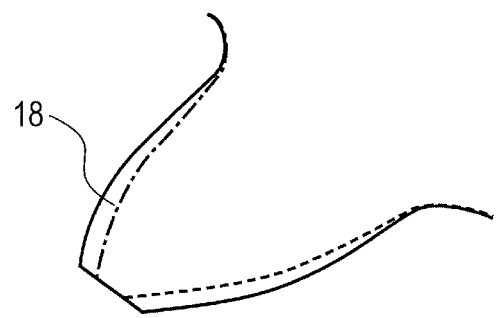
FIG. 7 is a view illustrating shrinkage of a tooth of the resin molded gear, for describing the difference in gear precision between the molded product manufactured by the method of manufacturing a resin molded gear by injection molding according to the embodiment of the present invention and the molded product manufactured by the conventional technology.

FIG. 7 is a view illustrating a shrinkage tendency of one tooth of the gear.

It was found from an experiment that, as indicated by reference numeral "18", the shrinkage increased at a tip of the tooth in a case where the surface temperature of the tooth portion was high.

Further, in FIG. 2, a tooth outer diameter dimension of the tooth portion is represented by "p", and a tooth width dimension of the tooth portion is represented by "q". It was found from an experiment that both the tooth outer diameter dimension "p" and the tooth width dimension "q" were reduced as the surface temperature of the tooth portion increased. That is, the surface temperature T2 of the tooth portion is decreased, and thus the sequential shrinkage behavior is suppressed in the vicinity of the tooth portion, with the result that a high-precision gear can be molded.

Example 1

As Example 1, a configuration example of the method of manufacturing a resin molded gear by injection molding to which the present invention is applied are described.

In Example 1, Tenac (trademark) HC750, which was produced by Asahi Kasei Chemicals Corporation and had the melting temperature Tm of 150° C., was used as a resin material.

Table 1 below shows a relationship between a pressure tendency and deformation of shape at the tooth portion at the time when the temperature of the medium flowing through each of the medium channels 21 and 22 was adjusted so that the thickness center temperature T1 of the web at the gate solidification time point "b" became (Tm−20)° C. or more to (Tm+20)° C. or less relative to the melting temperature Tm° C. of the resin.

In Example 1-1, and in Examples 1-2 and 1-3 described below, the thickness center temperature T1 at the gate solidification time point "b" was set to 130° C. or more to 170° C. or less.

The thickness center temperature T1 of Example 1-1 was set to 130° C. as a lower limit temperature, and the thickness center temperature T1 of Example 1-3 was set to 170° C. as an upper limit temperature.

Further, Comparative Examples 1-1 and 1-2 are examples in which the thickness center temperature was not within the setting range of the thickness center temperature T1 according to the present invention.

TABLE 1

Relationship among thickness center temperature of web at gate solidification time point "b", pressure tendency, and deformation

| Condition | Example 1-1 | Example 1-2 | Example 1-3 | Comparative Example 1-1 | Comparative Example 1-2 |
|---|---|---|---|---|---|
| Temperature of medium in channels 21, 22 | 70 | 75 | 90 | 60 | 40 |
| Thickness center temperature T1 of web (° C.) | 130 | 135 | 170 | 110 | 90 |
| Peak internal pressure Pmax (MPa) | 77 | 77 | 77 | 75 | 75 |
| Internal pressure Pb (MPa) | 60 | 63 | 68 | 52 | 47 |
| Inclination amount "r" of tooth portion (μm) | 9 | 8 | 6 | 22 | 39 |
| Tooth shape fluctuation tendency | Small | Small | Small | Medium | Large |

As described above, the thickness center temperature T1 of the web at the gate solidification time point "b" was set within the temperature range of the examples of the present invention, and thus it was possible to reduce the difference between the peak internal pressure Pmax applied to the tooth portion and the internal pressure Pb at the gate solidification time point "b" after the attenuation.

In this manner, the pressure attenuation was suppressed in the period from the injection start time point "a" to the gate solidification time point "b", and thus it was also possible to reduce the inclination amount "r" of the tooth portion, with the result that the deformation of the tooth portion was suppressed as well.

In addition, the tooth shapes in the tooth shape measurement regions 4, 5, and 6 of FIG. 6 had smaller fluctuation, with the result that a high-precision gear was molded.

On the other hand, Comparative Examples 1-1 and 1-2 did not satisfy the range of the thickness center temperature T1, and further, the pressure attenuation was significant at the tooth portion. Therefore, the inclination amount "r" of the tooth portion and the fluctuation in tooth shape increased in accordance with the attenuation amount.

Further, Table 2 below shows a relationship in shrinkage tendency at the tooth portion at the time when the temperature of the medium flowing through the medium channel 23 was adjusted so that the surface temperature T2 of the tooth portion at the gate solidification time point "b" became (T1−50)° C. or less.

In Examples 1-4 and 1-5, when the thickness center temperature T1 was 135° C., the surface temperature T2 was set to 85° C. or less.

Example 1-5 is an example in which the surface temperature was set to an upper limit temperature of the range of the surface temperature T2.

Further, Comparative Examples 1-3 and 1-4 are examples in which the surface temperature was not within the range of the surface temperature T2 according to the examples of the present invention.

As shown in Table 2, it was found that the shrinkage tendency 18 at the tip of the tooth as illustrated in FIG. 7 was suppressed when the surface temperature T2 of the tooth portion at the gate solidification time point was set within the temperature range according to the examples of the present invention.

Further, the shrinkage amount was reduced in terms of the tooth width dimension "q" and the tooth outer diameter dimension "p" of the tooth portion of the gear. On the other hand, in Comparative Examples 1-3 and 1-4, the surface temperature of the tooth portion at the gate solidification time point "b" was high. Therefore, the shrinkage tendency increased at the tip of the tooth, and further, the shrinkage amount increased in terms of the tooth width dimension and the tooth outer diameter dimension.

TABLE 2

Relationship between surface temperature of tooth portion at gate solidification time point "b" and shrinkage tendency at tooth portion

| Condition | Example 1-4 | Example 1-5 | Comparative Example 1-3 | Comparative Example 1-4 |
|---|---|---|---|---|
| Temperature of medium in channel 23 (° C.) | 30 | 35 | 60 | 80 |
| Thickness center temperature T1 of web (° C.) | 135 | 135 | 125 | 142 |
| Surface temperature T2 of tooth portion (° C.) | 73 | 85 | 92 | 105 |
| Shrinkage tendency 18 at tip of tooth | Small | Small | Medium | Large |
| Tooth width dimension "q" (mm) | 6.25 | 6.249 | 6.245 | 6.23 |
| Tooth outer diameter dimension "p" (mm) | 25.83 | 25.83 | 25.81 | 25.78 |

Table 3 shows effects on precision of a gear molded in Example 1-6, in which the thickness center temperature T1 of the web and the surface temperature T2 of the tooth portion at the gate solidification time point "b" were set within the temperature ranges according to the examples of the present invention, and effects on precision of gears molded in Comparative Examples 1-5 and 1-6, in which the thickness center temperature and the surface temperature was not within the temperature ranges according to the examples of the present invention.

TABLE 3

Effects on precision of gear relative to thickness center temperature T1 and surface temperature T2 at gate solidification time point "b"

| Condition | Example 1-6 | Comparative Example 1-5 | Comparative Example 1-6 |
|---|---|---|---|
| Thickness center temperature T1 of web (° C.) | 135 | 90 | 142 |
| Surface temperature T2 of tooth portion (° C.) | 73 | 79 | 105 |
| Helix error (μm) | 7 | 15.1 | 18.5 |
| Contact error (μm) | 5.5 | 7.7 | 9.3 |

Comparative Example 1-5 is an example in which the entire mold was held in a low-temperature state. The thickness center temperature T1 fell below the lower limit of the temperature range according to the examples of the present invention, and further, the surface temperature T2 was not within the temperature range according to the examples of the present invention.

Further, Comparative Example 1-6 is an example in which the entire mold was held in a high-temperature state. The thickness center temperature T1 was within the temperature range according to the examples of the present invention, but the surface temperature T2 was not within the temperature range according to the examples of the present invention.

As shown in Table 3, the gear molded in Example 1-6 had higher precision in terms of the helix error and the contact error as compared to the gears molded in Comparative Examples 1-5 and 1-6.

In Comparative Example 1-5, the thickness center temperature T1 of the web was low, and hence the deformation at the tooth portion became significant, with the result that the gear precision was deteriorated. In Comparative Example 1-6, the surface temperature T2 of the tooth portion was high, and hence the shrinkage behavior of the entire tooth portion became remarkable, with the result that the gear precision was deteriorated.

In Example 1-6, the gear was molded under a condition in which any of the factors of the deterioration of the gear precision were eliminated, with the result that a high-precision gear was molded.

Example 2

As a resin material, a resin other than the polyacetal resin was adopted for molding the gear by the molding method according to the present invention.

As the used resin, polyamide 6 (PA6) of Amilan (trademark) produced by Toray Industries, Inc., polybutylene terephthalate (PBT) of DURANEX (trademark) produced by Polyplastics Co., Ltd., polyethylene (PE) of Suntec (trademark) produced by Asahi Kasei Chemicals Corporation, and polypropylene (PP) of NOVATEC (trademark) produced by Japan Polypropylene Corporation were used.

Table 4 shows effects on precision of a gear molded in Example 2, in which the molding conditions were set within the temperature ranges according to the present invention, and effects on precision of a gear molded in Comparative Example 2 as a conventional technology, in which the molding conditions were set out of the temperature ranges according to the present invention.

TABLE 4

Comparison in precision of gear made of PA6, PBT, PE, and PP between example and comparative example

| | Comparative Example 2 | | | | Example 2 | | | |
|---|---|---|---|---|---|---|---|---|
| Resin material | PA6 | PBT | PE | PP | PA6 | PBT | PE | PP |
| Melting temperature Tm (° C.) | 220 | 228 | 130 | 170 | 220 | 228 | 130 | 170 |
| Thickness center temperature T1 of web (° C.) | 180 | 205 | 133 | 146 | 205 | 210 | 132 | 165 |
| Surface temperature T2 of tooth portion (° C.) | 148 | 172 | 90 | 95 | 143 | 156 | 75 | 110 |
| Helix error (μm) | 20.6 | 13 | 15.1 | 19.6 | 13.3 | 12.2 | 14.2 | 11.5 |
| Contact error (μm) | 13 | 12.5 | 16.3 | 12 | 9 | 7.2 | 6.5 | 7.7 |

In Comparative Example 2, in any cases of the above-mentioned resins, one or both of the thickness center temperature T1 and the surface temperature T2 were held in a state of falling out of the temperature ranges according to the examples of the present invention.

As a result, there occurred a clear difference between the precision of the gear molded in Comparative Example 2 and the precision of the gear molded in Example 2 according to the present invention, and the precision of the gear of Example 2 shows a more satisfactory result in any cases of the above-mentioned resins.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-148459, filed Jul. 4, 2011, which is hereby incorporated by reference herein in its entirety.

What is claimed is:

1. A method of manufacturing a resin molded gear by injection molding,
   the resin molded gear being integrally formed of a resin by injection molding, the resin molded gear comprising:
      a rim formed into a cylindrical shape;
      a tooth portion formed along an outer peripheral surface of the rim in an outward direction from a center axis of the cylindrical shape;
      a web, which joins to an inner peripheral surface of the rim and extends in a direction toward the center axis to have a flat disc shape; and
      a gate portion arranged at a boss, which joins to at least part of the web and is formed on a core portion located at the center axis,
   the resin having a melting temperature of Tm° C.,
   the method comprising:
      injecting the resin molten into a cavity of a mold for forming the resin molded gear; and
      cooling the mold when the gate portion is solidified so that a thickness center temperature T1 of the web becomes (Tm−20)° C. or more to (Tm+20)° C. or less and that a surface temperature T2 of the tooth portion becomes (T1−50)° C. or less.

2. The method of manufacturing a resin molded gear by injection molding according to claim 1, wherein the resin comprises any one of polyacetal, polyamide 6, polybutylene terephthalate, polyethylene, and polypropylene.

3. The method of manufacturing a resin molded gear by injection molding according to claim 1, wherein the cooling the mold comprises changing the thickness center temperature T1 of the web by adjusting temperature of a medium flowing through a medium channel formed in the mold.

4. The method of manufacturing a resin molded gear by injection molding according to claim 1, wherein the cooling the mold comprises changing the surface temperature T2 of the tooth portion by adjusting temperature of a medium flowing through a medium channel formed in the mold.

5. A method of manufacturing a resin molded gear by injection molding according to claim 1, after cooling the mold, further comprising further cooling the mold until a surface temperature of a molded product located inside the cavity becomes Tm° C. or less.

\* \* \* \* \*